United States Patent
Partelow et al.

Patent Number: 5,253,609
Date of Patent: Oct. 19, 1993

[54] PET DISH

[76] Inventors: Kenneth W. Partelow; Terry Seligman, both of 3395 Fisher Rd., Palm Harbor, Fla. 34683

[21] Appl. No.: 935,985
[22] Filed: Aug. 27, 1992
[51] Int. Cl.$^5$ ............................................. A01K 5/01
[52] U.S. Cl. ................................................... 119/61
[58] Field of Search ............... 119/51.5, 61; D30/129, D30/130

[56] References Cited

U.S. PATENT DOCUMENTS

| | | | |
|---|---|---|---|
| D. 269,386 | 6/1983 | Khider | 119/61 X |
| 314,454 | 2/1991 | Ahuna | D30/129 |
| 1,994,859 | 3/1935 | Langum | 119/61 X |
| 2,191,811 | 2/1940 | Trampier, Sr. | 119/61 X |
| 3,147,739 | 9/1964 | Shaheen | 119/61 X |
| 3,441,003 | 4/1969 | DuMond et al. | 43/121 |

Primary Examiner—Robert P. Swiatek
Attorney, Agent, or Firm—David Kiewit

[57] ABSTRACT

A pet food dish uses a combination of several water-filled moats and one or more climbing obstacles to prevent ants and other crawling insects from gaining access to the food in it. The dish has an upper, food containing, portion that is supported by a pedestal. The pedestal is preferably formed integrally with a base portion of the dish that incorporates a moated region. A separate deflector-trap is placed on the base unit around the pedestal. The deflector-trap comprises one of the climbing obstacles and has an intramural region that provides one of the moats.

8 Claims, 2 Drawing Sheets

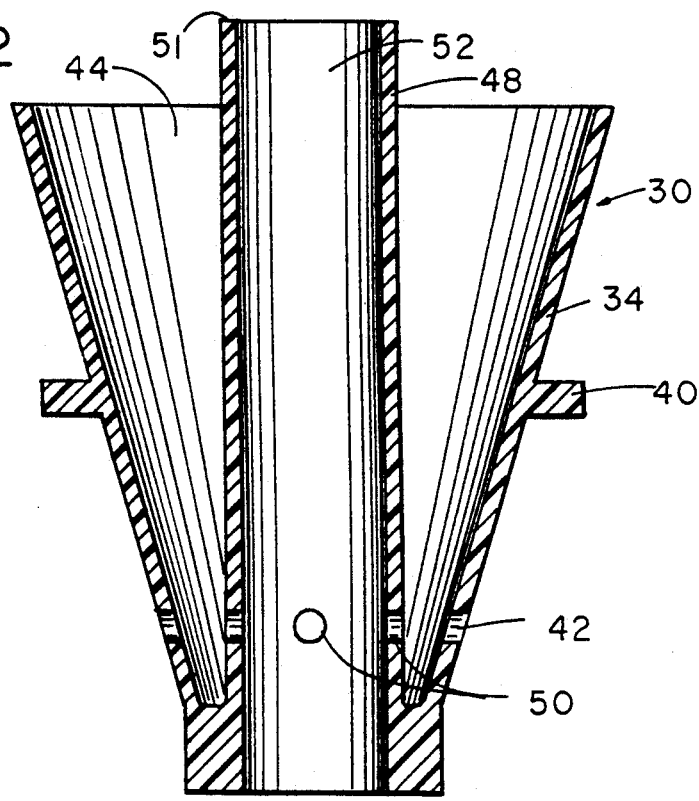
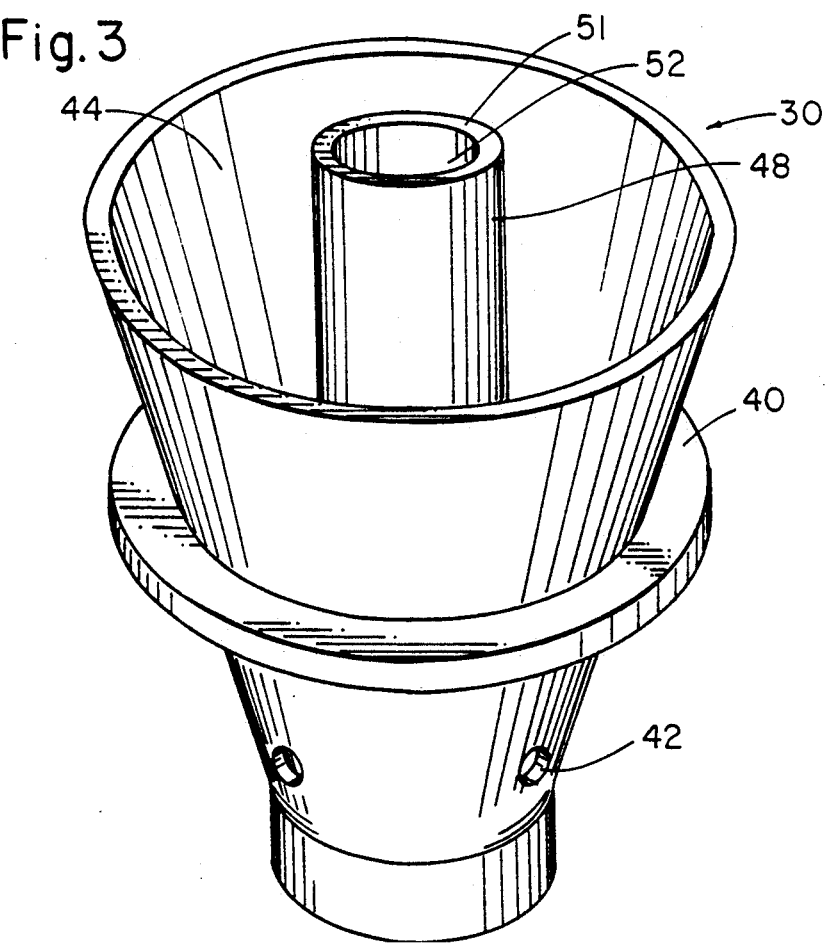

PET DISH

BACKGROUND OF THE INVENTION

A pet food dish prevents ants and other crawling insects from gaining access to the food in it. The improved dish uses a combination of two or more water obstacles, or moats, and one or more climbing obstacles, or deflectors, to achieve its purpose. The dish generally consists of two sections: an upper section that contains one or more bowls into which food or water may be placed; and a lower moat or tray section that contains insect-deterring obstacles and traps.

Moated pet food bowls have been described in the prior patent art by:

DuMond et al who teach, in U.S. Pat. No. 3,441,003, a two piece bowl having a base section with a moat surrounding a central stanchion. An upper, food-containing section has a centrally located pedestal-like projection on its bottom surface. Dumond et al's moat section is intended to be filled with an insecticide, following which the food-containing section is mated to the moat section by inserting the pedestal-like projection into the stanchion.

Ahuna, in U.S. Pat. No. D314,454, shows a pet dish having an upper food-containing section. A moat-like region appears to be provided in a lower portion of Ahuna's bowl.

Studies by the inventors have shown that a single water-filled moat, such as those shown by Ahuna and by DuMond et al, is ineffective in keeping ants and other crawling insects from reaching food in a pet dish. When faced with a moated dish similar to the ones shown by Ahuna or by DuMond et al, ants have been observed to crawl up the outer wall of the base, swim across the moat, crawl up the pedestal, across the bottom surface of the top portion of the composite structure, down the inner surface of the sloping outer wall of the upper section of the bowl and up the outer surface of that wall to reach the food in the dish. Thus, it appears that prior art moated pet dishes are ineffective against crawling insects unless, as is taught by DuMond et al, the moat is filled with an insecticide (preferably one that acts quickly enough to kill insects before they can swim across the moat and climb into and contaminate the pet food in the dish).

SUMMARY OF THE INVENTION

It is an object of the invention to provide a pet dish that prevents ants and other crawling insects from reaching food in the dish and that does so without using any toxic materials.

It is a further object of the invention to provide a multi-compartmented pet food dish that uses a moated base unit to prevent crawling insects and similar vermin from reaching food in the dish.

It is another object of the invention to provide a multi-moated, insect-excluding base for a pet food dish.

It is yet a further object of the invention to provide a deflector-trap structure, incorporated in the base of a moated-pet food dish, that is effective at preventing crawling insects from reaching food in the dish.

As will be shown in the subsequent discussion, these and other objectives will be accomplished by the provision of a moated pet food dish that has an insect deflector-trap that surrounds a pedestal used to hold a food-containing section of the dish above a moated base section.

DESCRIPTION OF THE DRAWING

FIG. 2 of the drawing shows additional cross section detail of an insect deflector-trap that is placed around the pedestal as shown in FIG. 1.

FIG. 3 of the drawing shows an elevational view of an insect deflector-trap having an inner tube with an elliptical cross-section.

DETAILED DESCRIPTION

Figure 1:
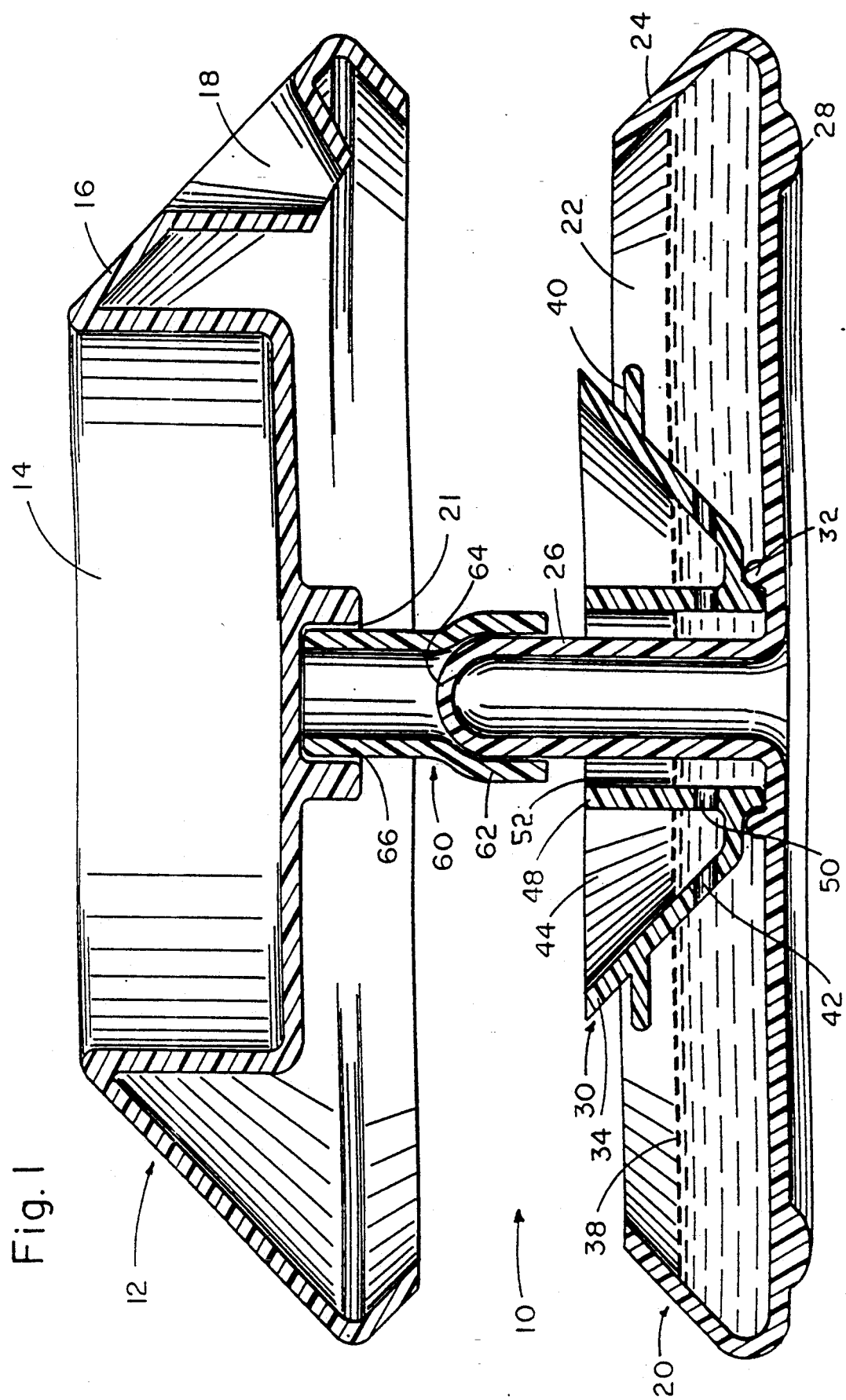
FIG. 1 of the drawing shows a vertical cross-section through a pet dish of the invention.

Turning initially to FIG. 1 of the drawing, one finds a cross-sectional view of a pet food dish 10 that has a top section 12 in which a food containing depression 14 is formed. The sloping outer wall 16 of the top section 12 may contain a fill-hole 18 used for adding water to the base unit 20. The food containing section 14 is shown as having relatively straight vertical sides (i.e. is drawn as a right circular cylinder), but it will be recognized that other shapes—e.g. a hemisphere—may be used, as is well known in the design of pet food dishes.

A principal feature of the base unit 20 is the tray, or moat, area 22 that can hold water, or some other non-toxic liquid that acts as a barrier to crawling insects. The base unit 20 has walls 24 that preferably slope inwardly, both to provide an initial barrier to crawling insects and to offer a means of keeping liquid from spilling out of the tray 22. A pedestal 26, which is preferably centrally located in the base unit 20, fits into a socket 21 formed on the bottom surface of the top section 12 and supports the top section 12 so that the food container or containers 14 are suspended above the moat. Thus, a crawling insect would have to climb the inwardly sloping walls 24, swim across the moat 22, and then climb the pedestal 26 in order to reach the bottom surface of the top section 12.

In the preferred structure, both the pedestal 26 and feet 28 are to be made integrally with the rest of the base unit 20 in a single molding operation. Alternately, a stanchion (such as the one shown by DuMond et al) may be formed in a base unit and adapted to the insertion of a pedestal that may be a separate element, or that may be formed integrally with a top portion. In either of these alternate structures, the act of filling a moat region bounded by the pedestal would act to flood the stanchion and to encourage the growth therein of various algae, molds etc. One reason, therefore, for preferring the illustrated structure is that it is easier to clean than are alternatives.

Observations of ants moving about a dish of the sort that is generally described in the preceding paragraph indicate that these insects can succeed in reaching food in the food container 14 by crawling across various surfaces and swimming a single moat—e.g. one bounded on the outside by the closed contour offered by the peripheral wall and on the inside by the pedestal. A key element of the present invention is an insect excluding deflector-trap 30 that is placed on the tray 22 around the pedestal 26. Preferably, a trap retaining wall 32, shown in FIG. 1 to be integrally formed into the base unit 20, is provided to hold the deflector-trap in a predetermined position.

The deflector-trap 30 is shown in greater detail in FIG. 2 of the drawing. The deflector-trap 30 includes an outer wall 34 that may be generally vertical when the deflector-trap 30 is installed in the base 20, but that is preferably slanted upward and outward from the base 20, as shown in all figures of the drawing. The outwardly slanted wall 34 is more difficult for an insect to climb onto than a vertical wall would be.

An insect that succeeds in swimming across the surface 38 of the water and in climbing onto the outwardly sloping wall 34 of the deflector-trap 30, is faced with an additional obstacle posed by a horizontal deflector and water-level indicator member 40 that extends outwardly from the wall 34.

A hole 42 in the outer wall 34 of the deflector-trap 30 is provided to allow water to flow into an intramural portion 44 of the deflector-trap. Thus, an insect that successfully surmounts the horizontal deflector member 40 and that then climbs to the top of the outer wall 34 is faced with an additional water obstacle or moat in the flooded intramural portion 44 of the deflector-trap 30.

The inner wall 48 of the deflector-trap 30 is a tubular element with a cross-sectional shape adapted to fit in a spaced-apart relation with whatever cross-sectional shape is selected for the pedestal 26. In the simplest case, the pedestal 26 is a cylindrical rod with a first diameter (e.g. 3 cm) and the inner wall 48 of the deflector-trap is a cylindrical tube with a second diameter (e.g. 4 cm). As shall be subsequently discussed, the pedestal 26 may be chosen to have a non-circular cross-section, so as to prevent the top section 12 from rotating about the base 20. In these cases, the inner wall 48 of the deflector-trap 30 is a tube with a similarly shaped cross-section and with dimensions chosen to ensure an appropriate gap (e.g. 5 mm) between the inner wall 48 and the pedestal 26 when the pet dish is assembled for use. The deflector-trap 30 that is shown in elevation in FIG. 3 of the drawing, for example, has an inner tube 51 with an elliptical cross-section.

A hole 50 is preferably provided in the inner tube 51 of the deflector-trap 30 so as to ensure flooding of the region between the inner wall 52 and the pedestal 26. The flooded region bounded on the outside by the inner wall 52 of the inner tube 51 and on the inside by the pedestal 26 provides a third water obstacle to a crawling insect.

Returning to FIG. 1 of the drawing, one can trace out the complicated path that a crawling insect would have to traverse in order to attain access to pet food in food container 14. The insect would have to crawl up the peripheral wall 24 of the base unit 20, swim across a first moat that extends across the greater portion of the tray portion 22 of the base unit 20, climb an outwardly sloping wall 34 of a deflector-trap 30, crawl across the horizontal deflector 40 on the wall 34, crawl to the intramural portion 44 of the deflector-trap 30, swim across the moat in the intramural portion 44 of the deflector-trap 30, climb up the outside wall 48 and down the inside wall 52 of the inner tube 51 of the deflector-trap 30, swim across the moat portion that lies between the inner wall 52 and the pedestal 26, climb the pedestal 26, crawl across the bottom surface of the top section 12, up the sloping outer wall 16 and into the food containers 14. Extensive observations by the inventors indicate that this complex a path is essentially impossible, and that the structure of the invention is successful at prohibiting access to pet food by crawling insects.

Although FIG. 1 of the drawing shows one common shape for a food containing section 14 of a pet dish, one can consider other sorts of food container that can be protected by the moat and trap combination of the invention. For example, many people feed and water a pet cat from a pet dish in which two generally hemispherical pet food containers 14 are formed in a single top section 12 of a elongated pet food dish 10. If the top section 12 of such an elongated dish were to rotate approximately 90° about the pedestal 26, the tray portion 22 of the base unit 20 would be exposed to the animal. Since the tray 22 may contain a variety of molds, dead insects, and the like, a pet owner may wish to keep the pet from getting access to the tray 22. Moreover, if the top section 12 of an elongated dish were to rotate about the pedestal 26, it would be likely to tip over, as there would be no portion of the base section 20 beneath the food containers 14. Both of these problems can be prevented by selecting a non-circular cross-section for the pedestal 26 (e.g. one that is elliptical in cross-section would match the inner tube 51 of the deflector-trap 30 that is shown in FIG. 3), which acts to prohibit the rotation of the top section. It may be noted that other known design approaches (e.g. the threaded fitting used by DuMond et al) can be used to assure that the upper portion of the dish does not rotate. Most of these approaches require more structural complexity and thereby increase the cost of manufacturing the pet food dish.

Turning again to FIG. 1 of the drawing, one finds a pedestal extension 60 that can be placed between the fixed pedestal 26 and the top section 12 of the bowl 10. The pedestal extension 60 has a bottom end 62 that fits over the top 64 of the pedestal 26 and a top end 66 that fits into a socket 21 that normally accommodates the top 64 of the pedestal 26. The extension 60 can be employed, for example, if the dish is to be placed on a lawn where the grass is high enough that a blade of grass could offer a crawling insect a means of bypassing the various obstacles offered by the invention and of directly accessing the outer wall 16 of the top portion 12 of the dish.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. A pet feeding dish comprising
   a tray portion having a generally concave upper surface adapted to hold a predetermined volume of liquid;
   a pedestal;
   a deflector-trap adapted to surround said pedestal, said deflector-trap having
      an inner wall with a first hole therethrough, said first hole located below the surface of said liquid, and an outer wall, having a second hole therethrough, said second hole located below said surface of said liquid; and
   a food containing portion, adapted to be supported above said tray portion by said pedestal.

2. A pet dish of claim 1 wherein said pedestal has a non-circular cross-section.

3. A pet dish of claim 1 wherein a generally horizontal deflector member extends outward from said outer wall of said deflector-trap.

4. A pet dish of claim 1 wherein said food containing portion includes a peripheral wall overhanging said tray portion and wherein a third hole is formed in said peripheral wall to provide means of filling said tray with said liquid.

5. A pet dish of claim 1, further comprising a pedestal extension having a first end adapted for the insertion therein of a top of said pedestal and a second end adapted to be inserted into a socket formed on a bottom surface of said top portion of said dish.

6. A moated pet feeding dish comprising a food-containing portion, a moat portion and a pedestal adapted to support said food-containing portion above said moat portion, wherein said moat portion comprises
- a peripheral wall forming a closed contour about said moat portion,
- a first moat defined by said peripheral wall and a second wall located inside said peripheral wall,
- a second moat defined by said second wall and a third wall located inside said second wall, and
- a third moat defined by said third wall and said pedestal, wherein a first hole in said second wall and a second hole in said third wall link said first, said second and said third moats so that a liquid placed in said moat portion attains a common level in said first, said second, and said third moats.

7. A moated pet dish of claim 6 further comprising a generally horizontal deflector member extending outwardly from said second wall.

8. A moated pet dish of claim 6 wherein each said moat is at least 5 mm in width.

* * * * *